No. 882,467. PATENTED MAR. 17, 1908.
O. HUBBELL.
ATTACHMENT FOR HAND RAKES.
APPLICATION FILED OCT. 21, 1907.
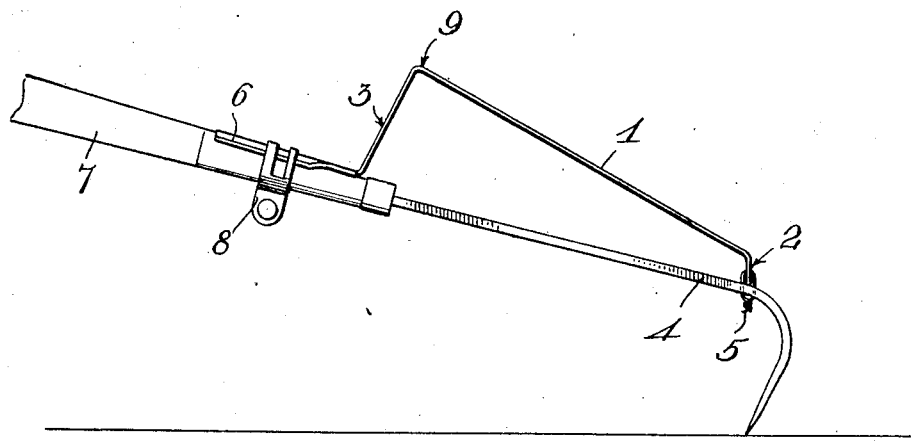
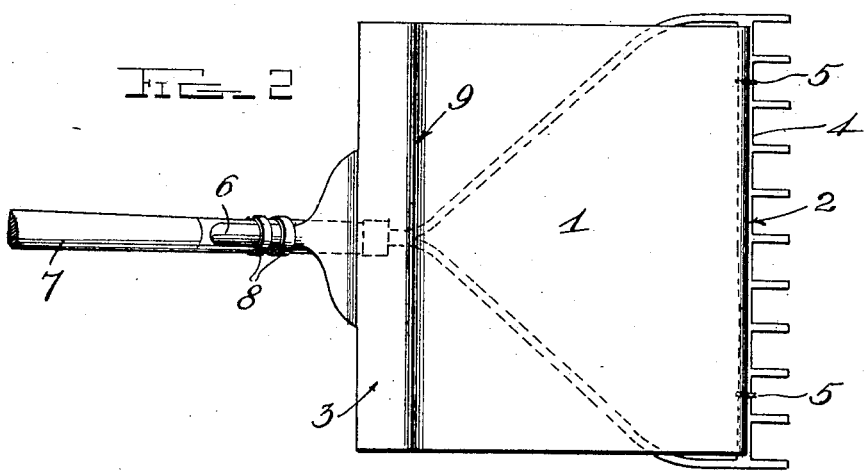
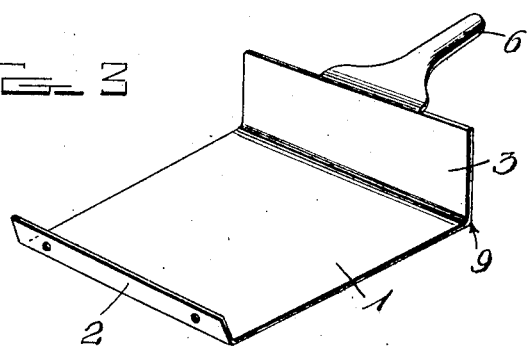
Witnesses
C. H. Griesbauer
Inventor
Orton Hubbell
by H. B. Willson & Co.
Attorneys

UNITED STATES PATENT OFFICE.

ORTON HUBBELL, OF PETALUMA, CALIFORNIA.

ATTACHMENT FOR HAND-RAKES.

No. 882,467.　　　Specification of Letters Patent.　　　Patented March 17, 1908.

Application filed October 21, 1907. Serial No. 398,470.

*To all whom it may concern:*

Be it known that I, ORTON HUBBELL, a citizen of the United States, residing at Petaluma, in the county of Sonoma and State of California, have invented certain new and useful Improvements in Attachments for Hand-Rakes; and I do declare the following to be a full, clear, and exact description of the invention, such as will enable others skilled in the art to which it appertains to make and use the same.

My invention relates to agricultural implements, and specifically to attachments for hand rakes.

The object of my invention is the provision of means, to be used in connection with hand rakes, hoes, and the like, for increasing the gathering surface of the implement and, when the implement is used on broken soil, for breaking clods and leveling and packing the soil.

To this end my invention is embodied in the device shown in the accompanying drawing wherein, like reference characters indicating similar parts; Figure 1 is a side view, showing the device attached to a garden rake, Fig. 2 shows a top plan view of the same. Fig. 3 represents a detail perspective view of a sheet metal plate.

As will appear from the drawing, the device consists of a substantially rectangular, sheet metal plate, 1, provided along one of its edges with a more or less narrow, downwardly directed flange, 2, and having a much larger portion, 3, of its opposite edge also bent in like manner and direction. The narrow flange, 2, is perforated at a number of points in its length to permit the plate being firmly seated on the upper portion of the rake, 4. Such means of securing the device to the implement may be adopted as convenience dictates, although I have shown the use of small pieces of tie wire, 5.

Midway the length of the opposite and wider flange, 3, the device is provided with an outwardly extending tongue, 6, designed to lie along and partially embrace the implement handle 7 and to be secured thereto in any desired manner, such for example, as the hose-clamp, 8, shown in the drawing. Obviously the tongue, 6, may form an integral portion of the plate or may be a riveted attachment. The functions of the device have been alluded to.

It will be seen that the large upper surface presents a surface well adapted to accomplish the disintegration of clods or to be used as a tamping surface for packing the earth over planted seed. Again, the comb or upper edge, 9, forms a straight-edge useful in levelings, while the inner surface of the plate may be used as a medium for transporting material gathered by the teeth of the rake, it being only necessary to invert the implement through the vertical movement of the outer end of the handle when the matter carried by the teeth will drop onto the plate.

The invention is not necessarily made from sheet metal but may be made from wood or any other suitable material.

Having thus described my invention, what I claim as new and desire to secure by Letters-Patent, is:

1. In a device of the character described, a plate of sheet metal having a flange upon a side thereof, a tongue upon said flange for attachment to a rake handle, and means for securing the opposing edge of said plate upon the rake, substantially as described.

2. In a device of the class described, a plate provided upon one edge with a relatively narrow flange, a wider flange upon the opposing edge thereof, a tongue extending laterally from said wide flange and adapted for attachment to the handle of a rake, and means for securing the narrow flange to the rake head.

In testimony whereof I have hereunto set my hand in presence of two subscribing witnesses.

ORTON HUBBELL.

Witnesses:
　J. L. DUNWIDDIE,
　J. L. WINANS.